(12) United States Patent
Suzuki et al.

(10) Patent No.: US 7,355,615 B2
(45) Date of Patent: Apr. 8, 2008

(54) OPTICAL SCANNING APPARATUS

(75) Inventors: Yoichi Suzuki, Kanagawa (JP); Tadashi Masuda, Kanagawa (JP); Yoshinori Morimoto, Kanagawa (JP); Kenichi Saito, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 412 days.

(21) Appl. No.: 11/192,180

(22) Filed: Jul. 29, 2005

(65) Prior Publication Data

US 2006/0023056 A1 Feb. 2, 2006

(30) Foreign Application Priority Data

Jul. 30, 2004 (JP) ............................ 2004-223242

(51) Int. Cl.
*B41J 2/47* (2006.01)
*B41J 2/385* (2006.01)

(52) U.S. Cl. ........................ 347/239; 347/134; 347/255

(58) Field of Classification Search ................ 347/134, 347/239, 255, 236, 237; 359/204, 205, 206
See application file for complete search history.

(56) References Cited

U.S. PATENT DOCUMENTS 7,075,689 B2 * 7/2006 Suzuki et al. ............... 359/204
7,269,193 B2 * 9/2007 Morimoto et al. ........ 372/38.02

* cited by examiner

*Primary Examiner*—An H. Do
*Assistant Examiner*—Sarah Al-Hashimi
(74) *Attorney, Agent, or Firm*—Birch, Stewart, Kolasch & Birch, LLP (57) ABSTRACT

The optical scanning apparatus includes a light amount reducing filter such as a neutral density filter which has transmittance $\eta_{nd}$ satisfying an expression $\eta_{nd}=(W_1/W_0)/(\eta_{AOM} \times \eta_{ref} \times \eta_{tra})$ and a light amount reducing function using absorption or reflection and which is disposed between a laser light source and an AOM on an optical path of laser light beam. In the expression, $W_0$ denotes the amount of light emitted from the laser light source, $W_1$ denotes the amount of light required for recording on a recording medium, $\eta_{AOM}$ denotes diffraction efficiency in the AOM, $\eta_{ref}$ denotes a sum of reflectances of reflective optical elements located between the laser light source and a surface to be scanned, of the recording medium, and $\eta_{tra}$ denotes a sum of transmittances of transmissive optical elements located between the laser light source and the surface to be scanned, other than transmittance of the neutral density filter.

13 Claims, 5 Drawing Sheets

OPTICAL SCANNING APPARATUS

This application claims priority on Japanese patent application No. 2004-223242, the entire contents of which are hereby incorporated by reference.

BACKGROUND OF THE INVENTION

The present invention relates to an optical scanning apparatus for recording a latent image on a recording medium, and more particularly, to an optical scanning apparatus for modulating laser light beam using an optical modulator and scanning the recording medium with the modulated laser light beam.

An optical scanning apparatus has been used for various image recording apparatuses such as a digital photo printer and an electrophotographic printer. In the optical scanning apparatus, a laser beam modulated in accordance with an image to be recorded is deflected in a predetermined one-dimensional direction (main scanning direction) and a recording medium such as a photosensitive material is scanned by exposure to the laser beam to record a latent image or a visualized image on the recording medium.

A semiconductor laser is mainly used as a light source for the optical scanning apparatus. The intensity of a laser beam emitted from the semiconductor laser is modulated in accordance with recording data, thereby recording an image on the recording medium. The intensity modulation of the laser beam is performed by output amplitude modulation or pulse width modulation.

A photosensitive material to be exposed may be sensitive to a wavelength range other than the wavelength range of a semiconductor laser currently available. In the case of such a photosensitive material, it is necessary to use a solid laser instead of the semiconductor laser. However, it may be difficult to perform high speed modulation through direct control of the solid laser. Therefore, it is necessary to externally modulate the intensity of the laser beam using an acoustic-optical modulator (AOM) or the like. Even when the semiconductor laser is used, there is a case where it is required to modulate the laser beam at a higher speed than a modulation speed which can be controlled with the semiconductor laser in view of the improvement of print productivity. Even in such a case, it is necessary to externally modulate the intensity of the laser beam using the AOM or the like.

In order to diffract the laser light beam emitted from the laser light source in the AOM, the laser light beam is allowed to enter the AOM so as to condense the laser light beam in the vicinity of a crystal surface of the AOM. At this time, there occurs a phenomenon in which dust floating in the apparatus collects at a beam incident point of the AOM. The deposition of dust on the crystal surface of the AOM, in particular, a region through which the beam passes causes a reduction in transmission efficiency, that is, a reduction in the amount of light on the surface to be exposed. Therefore, it is likely to impair print quality. Such a dust collecting phenomenon is more remarkable in a laser having a shorter wavelength.

In a printer having a calibration function, the output of the laser light source is increased by the reduced amount of light on the surface to be exposed to increase the amount of emitted light, whereby the print quality can be maintained. However, when the amount of emitted light from the laser light source is increased, it is likely to shorten the service life of the laser light source.

The crystal surface of the AOM is very fine and is readily damaged. Therefore, even when trying to remove dust deposited on the crystal surface of the AOM, the operation for removing the dust deposited on the crystal surface requires a large number of man-hours and a high cost. In order to prevent the dust from depositing on the crystal surface, it is possible to provide a sealing structure for the inner portion of an apparatus into which the AOM is incorporated. However, the structure is complicated in view of, for example, wiring of a harness connecting the laser light source with a laser light source driving portion provided outside a casing accommodating the laser light source. Therefore, this is not desirable in that costs, the number of parts, and the number of assembling steps are increased.

When the AOM is used, laser light beam having a beam diameter of several tens of μm or less is allowed to enter the AOM to diffract the laser beam. Therefore, the laser light beam is made incident on the crystal surface of the AOM in a high energy density state, so the crystal surface and a coating film formed thereon are damaged in some cases. In addition, there occurs not only the deposition of dust floating in the apparatus but also the deterioration of the surface of the AOM which is caused by burning of organic gas or the like. Even in such cases, the reduction in transmission efficiency of the AOM also impairs the print quality.

SUMMARY OF THE INVENTION

The present invention has been made to solve the above-mentioned problems. Therefore, an object of the present invention is to provide an optical scanning apparatus capable of recording a latent image on a recording medium by scanning the recording medium with a consistent amount of laser light beam while suppressing dust collection on an incident surface of an optical modulator by a simple structure.

In order to solve the above-mentioned problems, according to a first aspect of the present invention, there is provided an optical scanning apparatus for scanning a recording medium with laser light beam and exposing the recording medium to the laser light beam to record a latent image on the recording medium, comprising:

a laser light source which generates the laser light beam;

an optical modulator which is disposed on an optical path between the laser light source and the recording medium and is used to modulate the laser light beam;

a reducing filter which has a light amount reducing function for reducing light amount of the laser light beam using absorption or reflection of the laser light beam and is disposed on the optical path of the laser light beam between the laser light source and the optical modulator;

at least one reflection optical element disposed on the optical path of the laser light beam; and at least one transmission optical element disposed on the optical path of the laser light beam, wherein, when transmittance of the reducing filter is given by $\eta_{nd}$, amount of light emitted from the laser light source is given by $W_0$, amount of light required for recording on the recording medium is given by $W_1$, diffraction efficiency in the optical modulator is given by $\eta_{AOM}$, total reflectance of the at least one reflection optical element is given by $\eta_{ref}$, and total transmittance of the at least one transmission optical element is given by $\eta_{tra}$, the following expression (1)

$$\eta_{nd} = (W_1/W_0)/(\eta_{AOM} \times \eta_{ref} \times \eta_{tra}) \quad (1)$$

is satisfied.

According to the optical scanning apparatus in the first aspect of the present invention, it is preferable that the reducing filter is a reflection type reducing filter for reducing energy of transmitted light by reflection or absorption on at least one surface of a plate made of a glass material, or an absorption type reducing filter for reducing the energy of the transmission light by light absorbing substances dispersed into the glass material.

When an incident angle of the laser light beam incident on the reducing filter is given by $\theta$, an effective aperture width of the optical modulator is given by $\xi$, a thickness of the reducing filter is given by $T$, a refractive index of a medium in an ambience in which the reducing filter is disposed is given by $n_0$, and a refractive index of a glass material composing the reducing filter is given by $n_1$, it is another preferable that the following expressions (2) and (3), $$2T \times \tan\phi \times \cos\theta > \xi \quad (2)$$

$$\phi = \text{Arcsin}((n_0/n_1) \times \sin\theta) \quad (3)$$

is satisfied.

Here, when part of the laser light beam made incident on the reducing filter is reflected on a light incident surface of the reducing filter, it is further preferable that the optical scanning apparatus further comprises an absorber for absorbing a reflected light component which is the reflected part of the laser light beam and being disposed on an optical path of the reflected light component. In addition, it is still another preferable that the absorber has an outer diameter two or more times larger than a beam diameter of the reflected light component. It is still further preferable that the reducing filter is a neutral density filter.

In order to solve the above-mentioned problems, according to a second aspect of the present invention, there is provided an optical scanning apparatus for scanning a recording medium with laser light beam and exposing the recording medium to the laser light beam to record a latent image on the recording medium, comprising:

a laser light source which generates the laser light beam;

an optical modulator for modulating the laser light beam from the laser light source and disposed on an optical path between the laser light source and the recording medium;

at least one optical element which is disposed on the optical path between the laser light source and the optical modulator and has a light amount reducing function for reducing light amount of the laser light beam incident on the at least one optical element;

at least one reflection optical element disposed on the optical path of the laser light beam; and at least one transmission optical element disposed on the optical path of the laser light beam, wherein, when transmittance of the at least one optical element is given by $\eta_{nd}$, amount of light emitted from the laser light source is given by $W_0$, amount of light required for recording on the recording medium is given by $W_1$, diffraction efficiency in the optical modulator is given by $\eta_{AOM}$, total reflectance of the at least one reflection optical element is given by $\eta_{ref}$ and total transmittance of the at least one transmission optical element, other than the transmittance of the at least one optical element is given by $\eta_{tra}$, the following expression (4):

$$\eta_{nd} = (W_1/W_0)/(\eta_{AOM} \times \eta_{ref} \times \eta_{tra}) \quad (4)$$

is satisfied.

According to the optical scanning apparatus in the second aspect of the present invention, it is preferable that the at least one optical element is an optical element having a light amount reducing coating film for reducing the light amount of the laser light beam using absorption or reflection of the laser light beam, and the light amount reducing coating film is formed on a surface of the optical element. Alternatively, it is preferable that the at least one optical element is an optical element containing light absorbing substances and having an absorption type light amount reducing function.

According to the first and second aspects of the present invention, it is preferable that the optical scanning apparatus be used to expose a photosensitive material having a plurality of photosensitive layers. The laser light source is preferably composed of a plurality of laser light sources for emitting laser light beams having wavelengths corresponding to photosensitivities of the plurality of photosensitive layers. In this case, it is preferable that the photosensitive material be a photographic paper used for photographic print.

That is to say, it is preferable that the recording medium is a photosensitive material having a plurality of photosensitive layers. It is another preferable that the optical scanning apparatus further comprises at least one other laser light source and is used to expose the photosensitive material. It is further preferable that a plurality of laser light sources comprising the laser light source. It is still another preferable that the at least one other laser light source emit respective laser light beams having respective wavelengths corresponding to photosensitivities of the plurality of photosensitive layers. It is still further preferable that the photosensitive material is a photographic paper used for a photographic print.

According to the optical scanning apparatus of the present invention, in order to suppress the amount of laser light beam made incident on the optical modulator, the neutral density filter having the neutral density function using absorption or reflection is disposed between the laser light source and the optical modulator. Alternatively, the neutral density coating film for reducing the laser light beam is formed in at least one optical element disposed between the laser light source and the optical modulator or an optical element having the absorption type neutral density function using the light absorbing substances is used as the at least one optical element. Therefore, dust floating in the apparatus can be prevented from collecting on a light incident surface of the optical modulator, so it is possible to irradiate the recording medium with a consistent amount of laser light beam for a long period of time.

DETAILED DESCRIPTION OF THE PREFERRED EMBODIMENT

Hereinafter, a scanning lens and an optical scanning apparatus including the scanning lens according to a preferred embodiment of the present invention will be described in detail with reference to the accompanying drawings.

Figure 1:
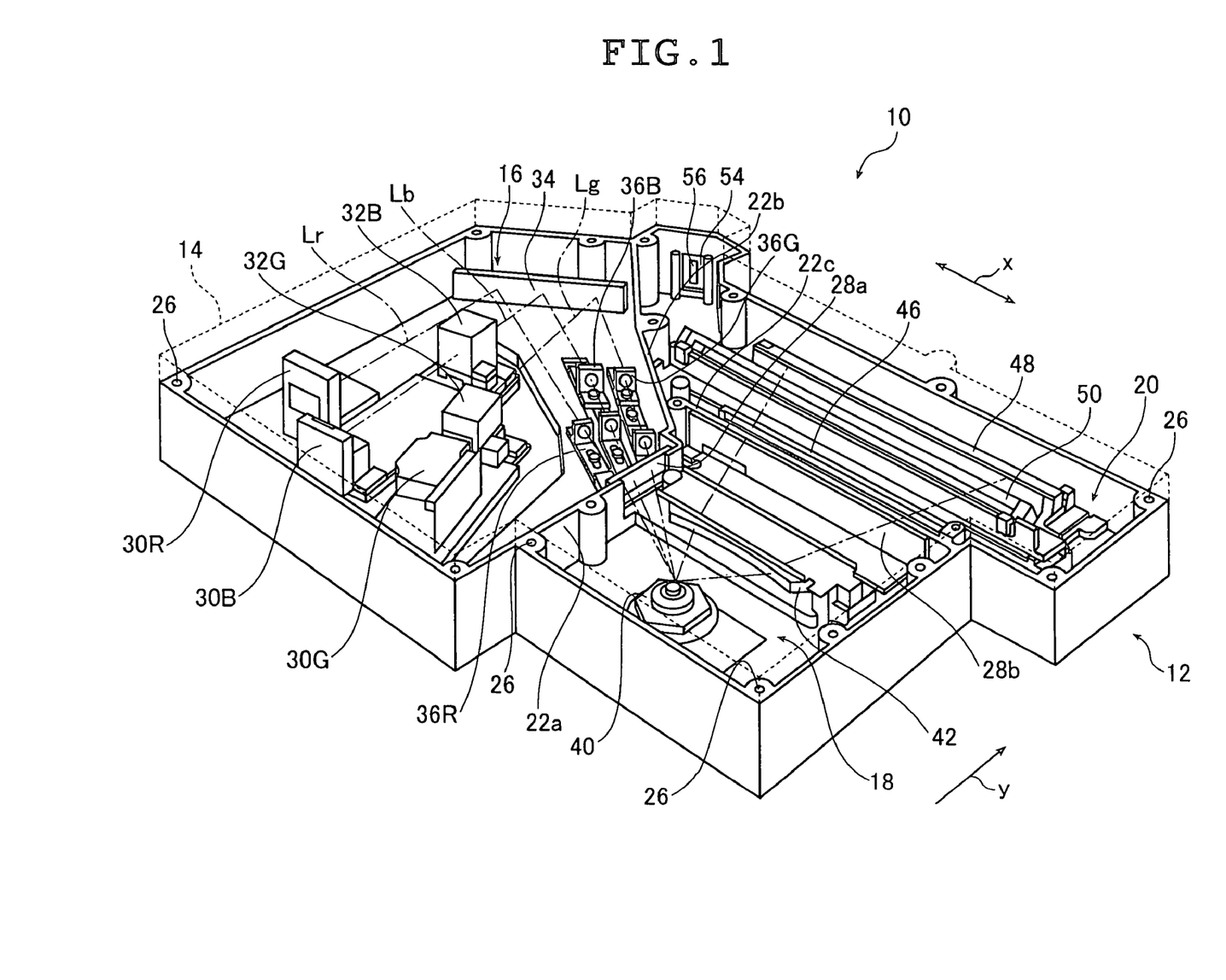
FIG. 1 is a schematic perspective view showing an optical scanning apparatus according to an embodiment of the present invention, in which a cover is removed.

FIG. 1 is a schematic structural view showing an embodiment of an optical scanning apparatus 10. The optical scanning apparatus 10 is an apparatus for recording an image on a photosensitive material. Three light beams (laser beams) L for R (red) exposure light, G (green) exposure light, and B (blue) exposure light which are modulated according to an image to be recorded (image data) are deflected in a one-dimensional direction (main scanning direction (direction indicated by an arrow x in FIG. 1)). These light beams are then allowed to enter the photosensitive material at a predetermined recording position (exposure position), so the photosensitive material can be scanned by exposure to the light beams.

The optical scanning apparatus 10 is used, for example, in a digital photo printer (printing apparatus) that produces a photographic print based on image data obtained by photoelectrically reading an image shot on a photographic film or image data of an image taken by a digital camera. In this printer, the photosensitive material (photographic printing paper) is conveyed in a direction orthogonal to the main scanning direction (sub scanning direction (direction indicated by an arrow y in FIG. 1)), to two-dimensionally scan a surface of the photosensitive material by exposure to the light beams deflected in the main scanning direction thereby recording a latent image thereon. The photosensitive material on which the latent image is recorded is supplied to a processor.

In the embodiment shown in FIG. 1, the optical scanning apparatus 10 includes a frame 12 serving as a casing in which one side surface is opened, a cover 14 for covering the opened side surface (upper surface) of the frame 12, and various optical elements fixed to the frame 12.

In the embodiment shown in FIG. 1, the frame 12 is a casing for accommodating and fixing the various optical elements composing a light beam optical scanning system and serves as an optical surface plate of the light beam optical scanning system. The frame 12 is made of, for example, an aluminum alloy. The frame 12 is roughly divided into a light source section 16, a light deflecting section 18, and a light emitting section 20 by partition walls 22 (22a, 22b, and 22c). Part of the partition wall 22a is removed and a transparent window member 28a is fixed to a region corresponding to the removed part. In addition, part of the partition wall 22c other than the upper part thereof is removed and a transparent window member 28b is fixed to a region corresponding to the removed part.

In total 17 screw holes 26 into which screws are screwed for firmly connecting the frame 12 with the cover 14 are formed in an external wall of the frame 12 and the partition walls 22.

In the embodiment shown in FIG. 1, the light source section 16 in the frame 12 includes laser light sources 30 (30R, 30B, and 30G), acoustic-optical modulators (AOMs) 32 (32G and 32B) serving as optical modulators, a mirror 34, and beam focus adjusting means 36 (36R, 36G, and 36B).

The laser light source 30R is a semiconductor laser for emitting a light beam Lr for R exposure. The laser light source 30B is a semiconductor laser for emitting a light beam Lb for B exposure. The laser light source 30G is a light source for emitting a light beam Lg for G exposure. The light beam Lg is generated as a secondary harmonic component obtained by a combination of a laser light source and a second harmonic generation (SHG) device.

The AOM 32B is disposed on an optical path of the light beam Lb emitted from the laser light source 30B and used to modulate the light beam Lb emitted from the laser light source 30B based on an image data signal. The AOM 32G is disposed on an optical path of the light beam Lg emitted from the laser light source 30G and used to modulate the light beam Lg based on an image data signal. The light beam Lr is modulated based on image data by direct modulation for modulation-driving the laser light source 30R.

Figure 2A:
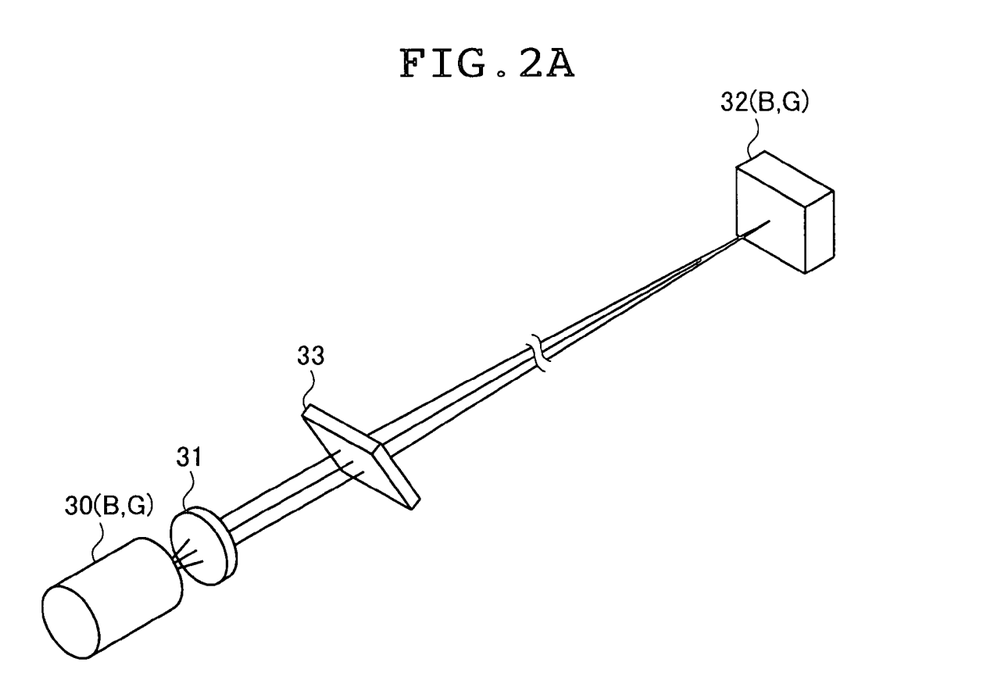
FIGS. 2A and 2B are each a perspective view and a sectional view showing optical parts disposed between a laser light source and an acoustic-optical modulator in the optical scanning apparatus according to the embodiment of the present invention.
Figure 2B:
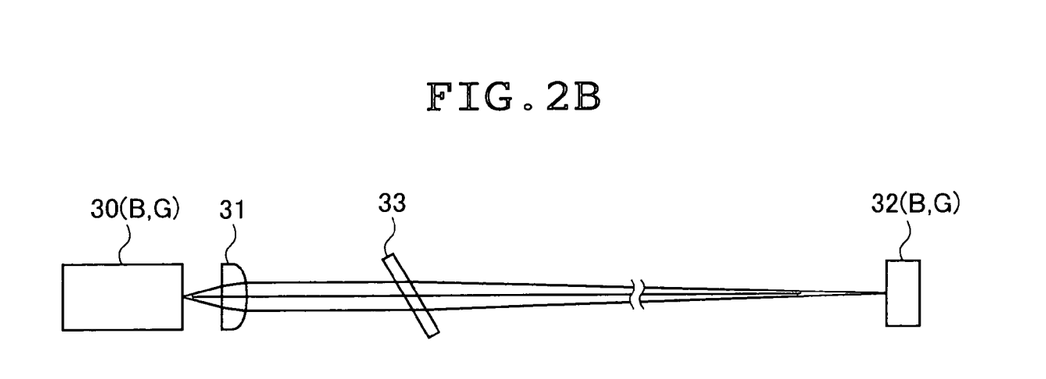

As shown in FIGS. 2A and 2B, a condensing lens 31 for condensing the laser light beam emitted from the laser light source 30B to the AOM 32B and a neutral density filter (ND filter) 33 for reducing the amount of the laser light beam are provided between the laser light source 30B and the AOM 32B. Similarly, a condensing lens for condensing the laser light beam emitted from the laser light source 30G to the AOM 32G and an ND filter 33 for reducing the amount of the laser light beam are provided between the laser light source 30G and the AOM 32G. In a conventional optical scanning apparatus, the ND filter for reducing the amount of light is disposed between an AOM and a deflector. On the other hand, the optical scanning apparatus according to this embodiment includes the ND filter located between the laser light source 30B and the AOM 32B, and the ND filter also located between the laser light source 30G and the AOM 32G. Hereinafter, the ND filter located between the laser light source 30B and the AOM 32B, and the ND filter located between the laser light source 30G and the AOM 32G will be described to explain the concept the present invention in detail.

The ND filter 33 has a structure in which a coating film for reducing the amount of incident light is formed on at least one surface of a thin glass plate. Although the thin glass plate is used to produce the ND filter, the present invention is not limited to this. It is possible to use an optically transparent material such as a transparent resin instead of the thin glass plate. A filter made of a light absorbing material, such as a reflection type ND filter or an absorption type ND lifter may be used as the ND filter.

In the present invention, the reflection type ND filter or the absorption type ND lifter is used, and its transmittance satisfies the following expression (1).

$$\eta_{nd} = (W_1/W_0)/(\eta_{AOM} \times \eta_{ref} \times \eta_{tra}) \quad (1)$$

In the expression (1), $W_0$ denotes the amount of light emitted from the laser light source and $W_1$ denotes the amount of light required to perform recording on a recording medium. When the recording medium is a photosensitive material having a photosensitive layer, $W_1$ indicates the amount of light necessary to expose the photosensitive layer. In addition, $\eta_{AOM}$ denotes diffraction efficiency in the optical modulator, which is a ratio of an incident light flux to a diffraction light flux to be used. Reference symbol $\eta_{ref}$ denotes total reflectance of reflective optical elements located between the laser light source and a surface to be scanned of the recording medium (surface of the recording medium). In the optical scanning apparatus shown in FIG. 1, the mirror 34, a cylindrical mirror 48, a mirror 50 for directing the light beams downward, and the like are the reflective optical elements. Reference symbol $\eta_{tra}$ denotes total transmittance of transmissive optical elements located between the laser light source and the surface to be scanned, other than the transmittance of the neutral density filter. In the optical scanning apparatus shown in FIG. 1, a scanning lens unit 42, lenses provided in the beam focus adjusting means 36R, 36G, and 36B, a cylindrical lens 46, and the like are the transmissive optical elements.

A general ND filter such as a reflection type ND filter or a transmission type ND lifter can be used as the ND filter. In the case of the reflection type ND filter, the surface of a glass material is subjected to Cr coating and a neutral density effect is obtained by the reflection and absorption of the filter. In the case of the transmission type ND filter, transmission light is reduced by a glass material into which light absorbing substances are dispersed.

In the present invention, the ND filter is disposed between the laser light source and the AOM. Therefore, a beam energy density on the incident crystal surface of the AOM is minimized, thereby suppressing a dust collection phenomenon on the crystal surface of the AOM. A reason why the dust collection phenomenon can be suppressed is as follows.

When floating dust or the like is irradiated with laser light beam, a light pressure caused by a change in momentum of the laser light beam acts on the dust in the propagation direction of the laser light beam, causing the dust collection on the crystal surface of the AOM. Therefore, the dust on which the light pressure of the laser light beam acts moves in the propagation direction of the laser light beam. That is, the dust moves to the crystal surface of the AOM. Then, the dust is deposited on the crystal surface of the AOM. Since the light pressure acting on the dust is proportional to laser power, that is, the amount of light, the dust is more likely to be deposited on the crystal surface as the amount of laser light beam increases.

In the conventional optical scanning apparatus, the neutral density filter is disposed between the AOM and the light deflector such as a polygon mirror, so the laser light beam emitted from the laser light source is made incident on the AOM as it is. As a result, the laser light beam having a relatively high intensity is made incident on the AOM. Therefore, the dust is likely to be deposited on the crystal surface of the AOM on the laser light beam incident side. When the AOM is used for a long period of time, the transmittance thereof reduces in some cases. In order to prevent the reduction of the transmittance, it is also possible to suppress the amount of light emitted from the laser light source and reduce the amount of light incident on the AOM. However, since the amount of light several times to several tens times larger than that necessary to record a latent image on the recording medium is required in view of the output characteristic (I-L characteristic) of the laser light beam and stable driving of the laser light source, it is not desirable to suppress the amount of light emitted from the laser light source.

In the optical scanning apparatus of the present invention, the ND filter is disposed between the laser light source and the AOM to reduce the amount of laser light beam incident on the AOM by the ND filter. Therefore, the dust collection on the crystal surface of the AOM can be suppressed as compared with a conventional method. Thus, a reduction in transmittance is suppressed, so the recording medium can be consistently irradiated with a desired amount of laser light beam for a long period of time.

Figure 3:
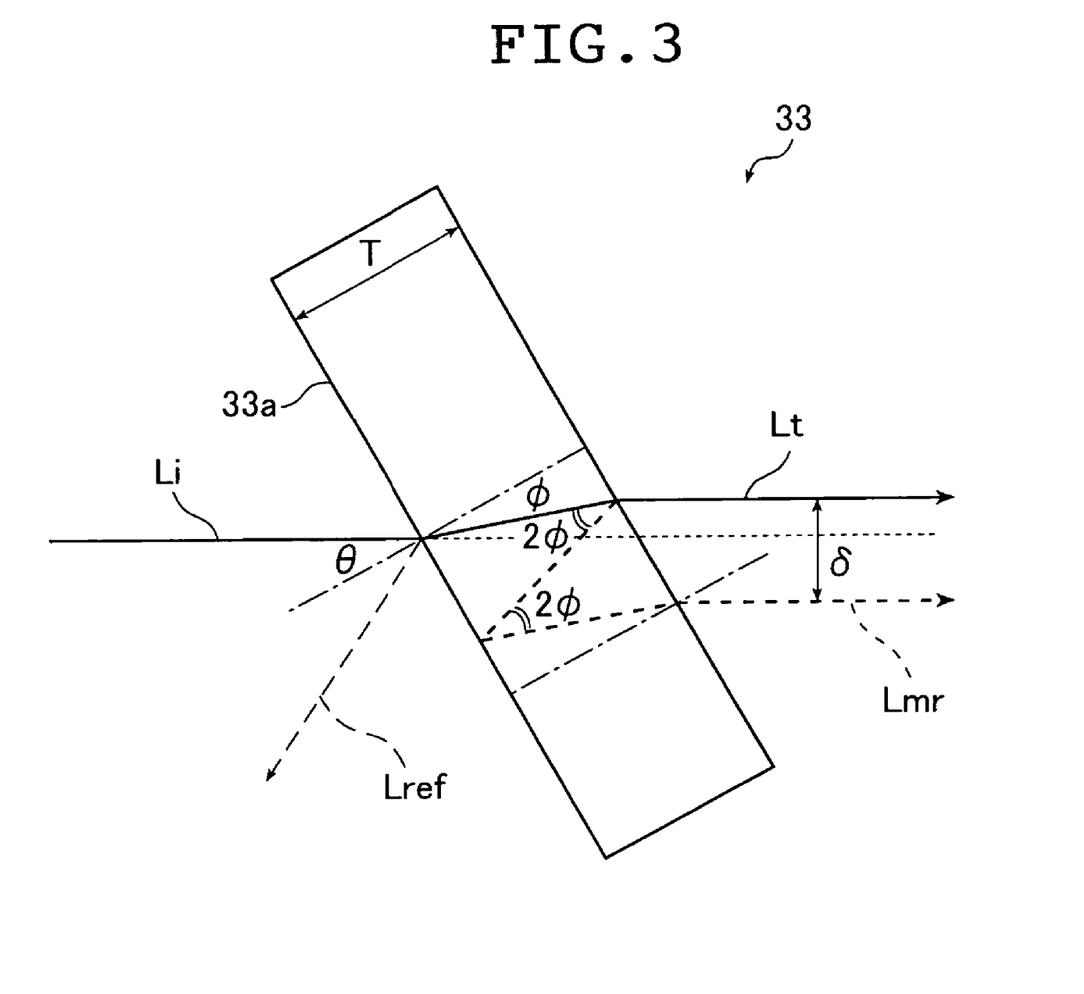
FIG. 3 is a view illustrating a relationship between an ND filter and laser light beam made incident on the ND filter.

As shown in FIG. 3, it is preferable to obliquely dispose the ND filter 33 relative to the optical axis of laser light beam Li. When the ND filter 33 is obliquely disposed relative to the optical axis of the laser light beam Li emitted from the laser light source 30, the situation can be prevented in which part of the laser light beam Li is reflected on the ND filter 33 and is made incident on the laser light source as return light.

The ND filter 33 is preferably disposed such that the laser light beam is made incident thereon at an incident angle θ which satisfies the following conditional expressions (2) and (3).

$$2T \times \tan \phi \times \cos \theta > \xi \quad (2)$$

$$\phi = Arcsin((n_0/n_1) \times \sin \theta) \quad (3)$$

In the expressions (2) and (3), as shown in FIG. 3, θ denotes the incident angle of the laser light beam Li incident on the ND filter 33. Reference symbol ξ denotes an effective aperture width of the AOM 32 and T denotes a thickness of the ND filter 33. Reference symbol $n_0$ denotes a refractive index of an ambience in which the ND filter 33 is disposed. In an atmospheric ambience, $n_0$ denotes a refractive index of air. Reference symbol $n_1$ denotes a refractive index of the thin glass plate (glass material) composing the ND filter 33.

The left side of the expression (2), that is, (2T×tan φ×cos θ) corresponds to a distance δ between multiple reflection light Lmr and transmission light Lt. The multiple reflection light Lmr is reflected twice within the ND filter 33 to exit therefrom. The transmission light Lt exits from the ND filter 33 without being reflected within the ND filter 33. In the present invention, the tilt angle of the ND filter 33 relative to the optical axis of the laser light beam, the thickness T of the ND filter 33, and a material of the coating film for reducing the laser light beam are preferably set such that the distance δ becomes larger than the effective aperture width of the AOM 32.

In the present invention, the ND filter 33 is disposed to satisfy the conditional expressions (2) and (3). Therefore, only the laser light beam Lt which is emitted from the laser light source 30 and exits from the ND filter 33 without being reflected multiple times within the ND filter 33 is allowed to enter an effective aperture portion of the AOM 32. The multiple reflection light Lmr caused by the multiple reflection within the ND filter 33 is guided to a region outside the effective aperture portion of the AOM 32, thereby preventing the multiple reflection light Lmr from entering the effective aperture portion of the AOM 32. Thus, it is possible to prevent the generation of flare light resulting from the multiple reflection light.

When the laser light beam Li is allowed to enter the ND filter 33, as shown in FIG. 3, part of the laser light beam is reflected on a light incident side surface 33a of the ND filter 33. In the present invention, it is preferable to dispose an absorber absorbing the reflected part. (hereinafter referred to as a reflected light component) Lref of the laser light beam on an optical path of the reflected light component Lref. For example, in a case where automatic power control (APC) is provided to stabilize the laser light source or the light emitted from the laser light source, when the absorber is disposed, the reflected light component Lref can be prevented from entering a photo diode used for the APC. The absorber can be formed in an arbitrary shape and preferably has a size (outer diameter) two times or more larger than the beam diameter of the reflected light component Lref. When the absorber is disposed as described above, the reflected light component Lref is surely absorbed. Therefore, the reflected light component Lref can be more surely prevented from entering other optical devices provided inside the optical scanning apparatus, such as the above-mentioned photo diode.

The absorber can be made of a material indicating light absorbency in a wavelength range of the reflected light component. For example, when red, green, and blue laser light beams each having a visible range wavelength are used as in this embodiment, flocked paper used to prevent the generation of inner reflection light in a camera or the like may be bonded to an inner portion of the apparatus. It is also effective to employ, for example, a method of performing black frosted alumite treatment on a region through which the reflected light component Lref passes.

In this embodiment, the two ND filters 33 are provided on the optical path of the laser light beam from the laser light source 30B and the optical path of the laser light beam from the laser light source 30G. The ND filter 33 may be provided on only one of the two optical paths. Here, in the case of the laser light source 30B having a shorter wavelength, dust collection is likely to be caused. Therefore, it is preferable to dispose the ND filter between the laser light source 30B and the AOM 32B. However, in order to effectively prevent a reduction in the amount of light due to the dust collection on the crystal surface of the AOM, it is preferable to dispose the ND filters 33 on both of the optical path of the laser light beam from the laser light source 30B and the optical path of the laser light beam from the laser light source 30G.

In this embodiment, the laser light beam from the laser light source 30R is modulated by direct modulation, so the AOM is not provided on the optical path thereof. The AOM may be disposed on the light exit side of the laser light source 30R to modulate the laser light beam emitted from the laser light source based on an image data signal by the AOM. In this case, the above-mentioned ND filter may be disposed between the laser light source 30R and the AOM.

In the embodiment shown in FIG. 1, the ND filters 33 are provided between the laser light sources 30 (30B and 30G) and the AOMs 32 (32B and 32G). However, the amount of light incident on each of the AOMs 32 may be reduced without providing the ND filter 33. In order to reduce the amount of light, a reflection type ND coating film is formed on an optical element disposed between the laser light source 30 and the AOM 32, or a light absorbing agent is dispersed into a material of the optical element to impart an absorption type neutral density effect to the optical element. For example, the above-mentioned coating film may be formed on at least one of the light incident side surface and the light exit side surface of the condensing lens 31 shown in FIG. 2. Therefore, even when a neutral density function is provided for the optical element disposed between the laser light source 30 and the AOM 32, the beam energy density on the incident crystal surface of the AOM can be minimized. Thus, it is possible to prevent the occurrence of the dust collection phenomenon on the crystal surface of the AOM, a reduction in transmittance resulting therefrom, and a reduction in the amount of light on a surface to be scanned.

Even in such a case, a method similar to the above-mentioned neutral density method can be applied to reduce the amount of light. That is, a material having transmittance $\eta_{nd}$ satisfying the following expression (4) may be used for the neutral density filter, assuming that the amount of light emitted from the laser light source 30 is given by $W_0$, the amount of light required for recording on the recording medium is given by $W_1$, the diffraction efficiency in the AOM 32 is given by $\eta_{AOM}$, the total reflectance of the reflective optical elements located between the laser light source 30 and the surface to be scanned of the recording medium is given by $\eta_{ref}$, and the total transmittance of the transmissive optical elements located between the laser light source and the surface to be scanned, other than the transmittance of the neutral density filter, is given by $\eta_{tra}$.

$$\eta_{nd}=(W_1/W_0)/(\eta_{AOM}\times\eta_{ref}\times\eta_{tra}) \qquad (4)$$

In addition to the arrangement of the ND filter 33 between the laser light source 30 and the AOM 32, a neutral density coating film is formed on another optical element, such as the condensing lens 31, which is disposed between the laser light source 30 and the AOM 32, or a light absorbing agent is dispersed into the optical element to impart an absorption type neutral density effect.

The ND filter 33 which is disposed between the laser light source 30 and the AOM 32 and used to reduce the amount of laser light beam incident on the AOM 32 has been described. Next, other constituent parts of the optical scanning apparatus 10 will be described with reference to FIG. 1.

In the optical scanning apparatus shown in FIG. 1, the mirror 34 is provided to reflect the light beams Lr, Lg, and Lb respectively emitted from the laser light sources 30R, 30G, and 30B onto the same line or its vicinity on a reflective surface of an optical deflector 40. The beam focus adjusting means 36R is disposed on the optical path of the light beam Lr reflected on the mirror 34 and adjusts the focus (beam diameter) of the light beam Lr. The beam focus adjusting means 36G is disposed on the optical path of the light beams Lg reflected on the mirror 34 and adjusts the focus (beam diameter) of the light beam Lg. The beam focus adjusting means 36B is disposed on the optical path of the light beam Lb reflected on the mirror 34 and adjusts the focus (beam diameter) of the light beam Lb. The light beams Lr, Lg, and Lb whose beam focuses are adjusted by the beam focus adjusting means 36R, 36G, and 36B pass through a window member 28a and is made incident on the optical deflector 40.

The light deflecting section 18 of the frame 12 includes the optical deflector 40 and an fθ lens (scanning lens) 42. The light emitting section 20 of the frame 12 includes the cylindrical lens 46, the cylindrical mirror 48, and the flat mirror (mirror for directing the light beams downward) 50.

The light beams L (Lr, Lb, and Lg) deflected in the main scanning direction by the optical deflector 40 are adjusted by the scanning lens unit 42 so as to have uniform scanning speeds.

The light beams L that have passed through the scanning lens unit 42 pass through the window member 28b and the cylindrical lens 46. Then, the light beams L are reflected on the cylindrical mirror 48 to adjust the optical paths and correct image plane tilts. After that, the light beams L are reflected downward by the flat mirror 50 and incident on the photosensitive material.

Figure 4:
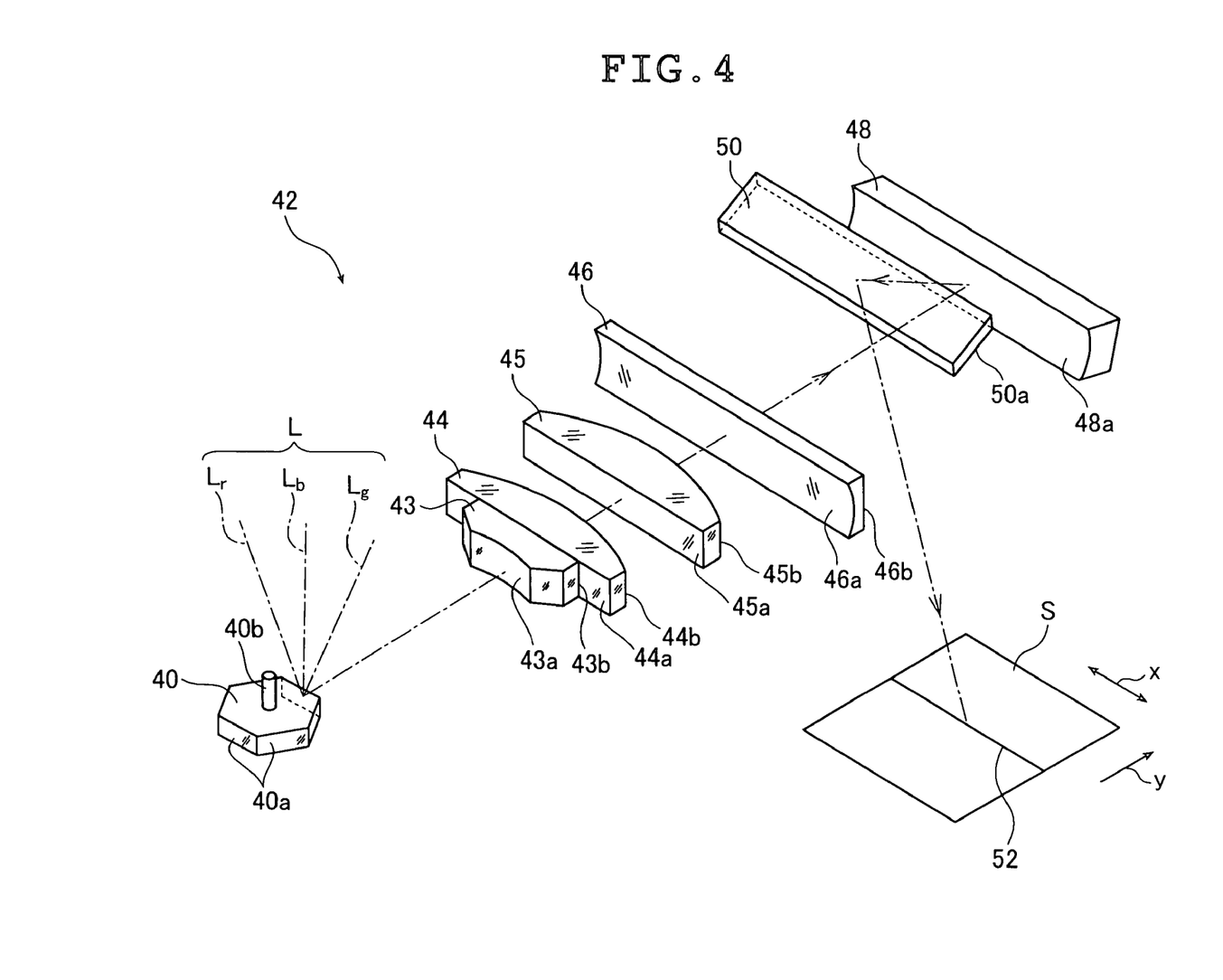
FIG. 4 is a schematic perspective view showing optical parts disposed in a light deflecting section and a light emitting section of the optical scanning apparatus shown in FIG. 1.

Here, optical parts which are disposed in the light deflecting section 18 and the light emitting section 20 of the frame 12 of the optical scanning apparatus shown in FIG. 1 will be specifically described. FIG. 4 shows a schematic configuration of the optical parts which are disposed in the light deflecting section 18 and the light emitting section 20.

The optical deflector 40 is a polygon mirror having six reflective surfaces (deflective surfaces) 40a and rotated about a rotational shaft 40b by a motor (not shown). The refractive surface 40a of the polygon mirror 40 is irradiated with the light beams (laser light beams) Lr, Lg, and Lb respectively emitted from the laser light sources 30R, 30G, and 30B shown in FIG. 1 at substantially the same position in a rotational shaft direction. The laser light beam incident on the polygon mirror 40 is reflected on the refractive surface 40*a* and deflected to the side on which the scanning lens unit 42 is disposed.

The scanning lens unit 42 is composed of three lenses, that is, a first lens 43, a second lens 44, and a third lens 45. The first lens 43 is a plano-concave lens in which one surface is a concave surface 43*a* and the other surface is a flat surface 43*b*. The first lens 43 is disposed such that the concave surface 43*a* serving as a lens surface faces to the optical deflector 40 side (light incident side). The second lens 44 is a plano-convex lens in which one surface is a flat surface 44*a* and the other surface is a convex surface 44*b*. The second lens 44 is disposed such that the flat surface 44*a* serving as the lens surface faces to the optical deflector 40 side (light incident side). The third lens 45 is also a plano-convex lens in which one surface is a flat surface 45*a* and the other surface is a convex surface 45*b*. The third lens 45 is disposed such that the flat surface 45*a* serving as the lens surface faces to the optical deflector 40 side (light incident side). As shown in FIG. 4, the first lens 43 and the second lens 44 are disposed such that the flat surfaces 43*b* and 44*a* are in intimate contact with each other. Each of the concave surface 43*a* of the first lens 43 and the convex surface 44*b* of the second lens 44 is a cylindrical surface having power only in the deflection direction (main scanning direction). The convex surface 45*b* of the third lens 45 is the cylindrical surface or a spherical surface.

As shown in FIG. 4, the cylindrical lens 46, the cylindrical mirror 48, and the flat mirror 50 are disposed on the light exit side of the scanning lens unit 42. One surface of the cylindrical lens 46 is a concave cylindrical surface 46*a* having power only in a direction perpendicular to the deflection direction and the other surface thereof is a flat surface 46*b*. The cylindrical lens 46 is disposed such that the cylindrical surface 46*a* faces to the scanning lens unit 42 side. The flat mirror 50 is disposed between the cylindrical lens 46 and the cylindrical mirror 48 and above them. The cylindrical mirror 48 is disposed such that light incident on the reflective surface 48*a* is made incident on a reflective surface 50*a* of the flat mirror 50 disposed above. The laser light beam that has passed through the cylindrical lens 46 is made incident on the cylindrical mirror 48 to be reflected thereon, and then made incident on the flat mirror 50. The laser light beam incident on the flat mirror 50 is reflected to a recording medium (photosensitive material) S. The image plane tilt of the polygon mirror 40 is corrected by the cylindrical lens 46 and the cylindrical mirror 48.

In the optical scanning apparatus 10, the three light beams L (Lr, Lb, and Lg) emitted from the respective light sources are made incident on the polygon mirror 40 at the same point and deflected. Then, as shown in FIG. 4, the light beams are made incident on the photosensitive material S at predetermined recording positions to form one and the same scanning line 52. Therefore, the respective light beams L travel along optical paths which are different from one another in the main scanning direction and substantially aligned with one another in the sub scanning direction. Then, the light beams L are made incident on the photosensitive material S at the predetermined recording positions (non-beam-synthesizing light beam scanning optics, more specifically, three-laser beam different-angle incidence optics or three-light source non-beam-synthesizing optics).

Next, an optical sensor for synchronous signal for starting image recording on the photosensitive material S (SOS (start of scan)) will be described with reference to FIGS. 1 and 5. In the optical scanning apparatus 10, an optical sensor 54 is disposed in the light emitting section 20 of the frame 12. The optical sensor 54 is a line sensor extending in a vertical direction (that is, substantially sub scanning direction).

Figure 5:
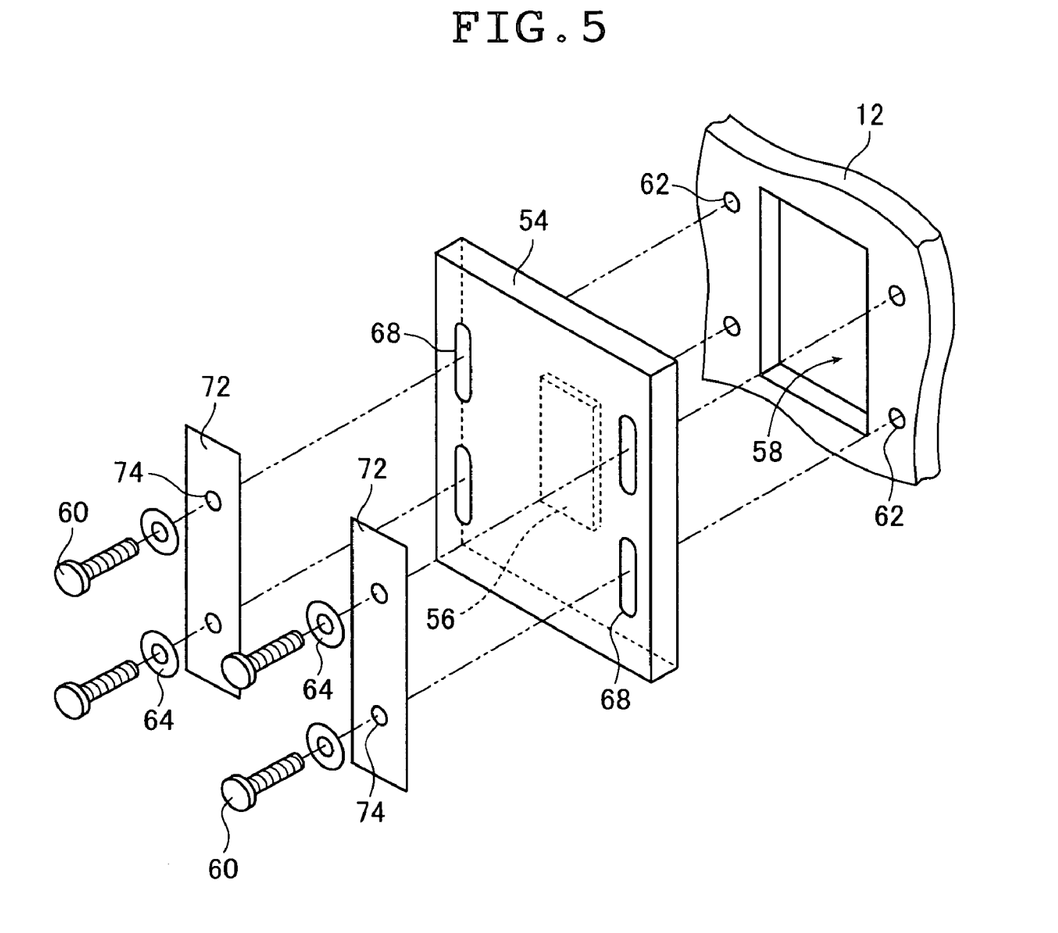
FIG. 5 is a schematic exploded perspective view illustrating how an SOS sensor is mounted on the optical scanning apparatus shown in FIG. 1.

As shown in FIG. 5, an opening 58 that is bored through an outer wall of the frame 12 and is used to insert a light receiving portion 56 of the optical sensor 54, and four bolt holes 62 through which bolts 60 for fixing the optical sensor 54 are inserted are formed in the frame 12 of the optical scanning apparatus 10.

Four bolt holes 68 through which the bolts 60 are inserted are formed in the optical sensor 54. Two plate members 72 extending in the vertical direction are located on the rear surface (surface opposed to the surface on which the light receiving portion 56 is located) of the optical sensor 54. Two through holes 74 each having a diameter corresponding to a diameter of each of the bolts 60 are provided in each of the plate members 72. The two through holes 74 correspond to the bolt holes 68 arranged in the vertical direction. Note that one of the two through holes 74 provided in each of the plate members 72 may be a slightly long hole for accommodating tolerance.

The light receiving portion 56 of the optical sensor 54 is inserted into the inner portion of the frame 12 from the opening 58. The plate members are located on the rear surface of the optical sensor 54. The bolts 60 are inserted through the through holes 74 of the plate members 72, the bolt holes 68 of the optical sensor 54 and the bolt holes 62, and tightened with washers 64 and nuts (not shown) to fix the optical sensor 54 to the frame 12.

Each of the bolt holes 68 of the optical sensor 54 is a long hole extending in the vertical direction. Therefore, even when the cover 14 is not removed from the optical scanning apparatus 10, that is, the frame 12 is closed, the position of the optical sensor 54 in the vertical direction (substantially sub scanning direction) can be adjusted from the outside.

In the embodiment shown in FIG. 5, the bolt holes 68, each of which is a long hole are closed by the two plate members 72 to fix the optical sensor 54 to the frame 12. Therefore, even when the bolts 60 are loosened to adjust the position of the optical sensor 54, it is possible to prevent dust from entering the inner portion of the frame 12 through the bolt holes 68 and 62.

As shown in FIG. 1, the upper surface (open surface) of the frame 12 in which the optical elements are fixed is covered with the cover 14. The optical scanning apparatus 10 is (substantially) sealed by covering the upper surface of the frame 12 with the cover 14. Therefore, dust resistance in the optical scanning apparatus, that is, dust resistance of each of the optical elements disposed in the frame 12 is ensured. Such a configuration allows the dust collection on the AOM to be further suppressed.

A method of firmly connecting the frame 12 with the cover 14 is not particularly limited. Therefore, it is possible to employ various known methods such as a method using screws, a method using bolts and nuts, and a method in which a fixing member is combined with engagement between recesses and projections.

The optical scanning apparatus of the present invention has been described in detail. However, the present invention is not limited to the above-mentioned embodiment. Thus, various improvements and modifications may be made without departing from the scope of the present invention.

For example, in the structure shown in FIG. 2, in order to reflect part of light incident on the neutral density filter downward, the neutral density filter is disposed such that the upper end portion thereof is located on the left side in FIG. 2 and the lower end portion thereof is located on the right side in FIG. 2. However, in order to reflect part of light upward, the neutral density filter may be disposed such that the upper end portion thereof is located on the right side in FIG. 2 and the lower end portion thereof is located on the left side in FIG. 2. In this case, an absorber for absorbing light reflected upward may be provided in, for example, the cover of the optical scanning apparatus.

In the above-mentioned embodiment, the AOM is used as the optical modulator. An electro-optical modulator (EOM) can be also used.

The optical scanning apparatus of the present invention is not limited to an apparatus for exposing the photosensitive material and can be also applied to an apparatus for scanning a surface with a light beam at substantially constant speed, such as a display apparatus.

What is claimed is:

1. An optical scanning apparatus for scanning a recording medium with laser light beam and exposing said recording medium to said laser light beam to record a latent image on said recording medium, comprising:
    a laser light source which generates said laser light beam;
    an optical modulator which is disposed on an optical path between said laser light source and said recording medium and is used to modulate said laser light beam;
    a reducing filter which has a light amount reducing function for reducing light amount of said laser light beam using absorption or reflection of said laser light beam and is disposed on said optical path of said laser light beam between said laser light source and said optical modulator;
    at least one reflection optical element disposed on said optical path of said laser light beam; and
    at least one transmission optical element disposed on the optical path of the laser light beam,
    wherein, when transmittance of said reducing filter is given by $\eta_{nd}$, amount of light emitted from said laser light source is given by $W_0$, amount of light required for recording on said recording medium is given by $W_1$, diffraction efficiency in said optical modulator is given by $\eta_{AOM}$, total reflectance of said at least one reflection optical element is given by $\eta_{ref}$, and total transmittance of said at least one transmission optical element is given by $\eta_{tra}$, the following expression (1)

$$\eta_{nd} = (W_1/W_0)/(\eta_{AOM} \times \eta_{ref} \times \eta_{tra}) \quad (1)$$

is satisfied.

2. The optical scanning apparatus according to claim 1, wherein said reducing filter is a reflection type reducing filter for reducing energy of transmitted light by reflection or absorption on at least one surface of a plate made of a glass material, or an absorption type reducing filter for reducing said energy of the transmission light by light absorbing substances dispersed into said glass material.

3. The optical scanning apparatus according to claim 1, wherein, when an incident angle of said laser light beam incident on said reducing filter is given by $\theta$, an effective aperture width of said optical modulator is given by $\xi$, a thickness of said reducing filter is given by $T$, a refractive index of a medium in an ambience in which said reducing filter is disposed is given by $n_0$, and a refractive index of a glass material composing said reducing filter is given by $n_1$, the following expressions (2) and (3), $$2T \times \tan \Phi \times \cos \theta > \xi \quad (2)$$

$$\Phi = \text{Arcsin}((n_0/n_1) \times \sin \theta) \quad (3)$$

is satisfied.

4. The optical scanning apparatus according to claim 1, wherein, when part of said laser light beam made incident on said reducing filter is reflected on a light incident surface of said reducing filter, said optical scanning apparatus further comprises an absorber for absorbing a reflected light component which is said reflected part of said laser light beam and being disposed on an optical path of said reflected light component.

5. The optical scanning apparatus according to claim 4, wherein said absorber has an outer diameter two or more times larger than a beam diameter of said reflected light component.

6. The optical scanning apparatus according to claim 1, wherein said reducing filter is a neutral density filter.

7. The optical scanning apparatus according to claim 1, wherein
    said recording medium is a photosensitive material having a plurality of photosensitive layers,
    said optical scanning apparatus further comprises at least one other laser light source and is used to expose said photosensitive material,
    a plurality of laser light sources comprising said laser light source and said at least one other laser light source emit respective laser light beams having respective wavelengths corresponding to photosensitivities of said plurality of photosensitive layers.

8. The optical scanning apparatus according to claim 7, wherein said photosensitive material is a photographic paper used for a photographic print.

9. An optical scanning apparatus for scanning a recording medium with laser light beam and exposing said recording medium to said laser light beam to record a latent image on said recording medium, comprising:
    a laser light source which generates said laser light beam;
    an optical modulator for modulating said laser light beam from said laser light source and disposed on an optical path between said laser light source and said recording medium;
    at least one optical element which is disposed on said optical path between said laser light source and said optical modulator and has a light amount reducing function for reducing light amount of said laser light beam incident on said at least one optical element;
    at least one reflection optical element disposed on said optical path of said laser light beam; and
    at least one transmission optical element disposed on the optical path of the laser light beam,
    wherein, when transmittance of said at least one optical element is given by $\eta_{nd}$, amount of light emitted from said laser light source is given by $W_0$, amount of light required for recording on said recording medium is given by $W_1$, diffraction efficiency in said optical modulator is given by $\eta_{AOM}$, total reflectance of said at least one reflection optical element is given by $\eta_{ref}$, and total transmittance of said at least one transmission optical element, other than the transmittance of the at least one optical element is given by $\eta_{tra}$, the following expression (4):

$$\eta_{nd} = (W_1/W_0)/(\eta_{AOM} \times \eta_{ref} \times \eta_{tra}) \quad (4)$$

is satisfied.

10. The optical scanning apparatus according to claim 9, wherein said at least one optical element is an optical element having a light amount reducing coating film for reducing said light amount of said laser light beam using absorption or reflection of said laser light beam, and said light amount reducing coating film is formed on a surface of said optical element.

11. The optical scanning apparatus according to claim 9, wherein said at least one optical element is an optical element containing light absorbing substances and having an absorption type light amount reducing function.

12. The optical scanning apparatus according to claim 9, wherein said recording medium is a photosensitive material having a plurality of photosensitive layers, said optical scanning apparatus further comprises at least one other laser light source and is used to expose said photosensitive material, a plurality of laser light sources comprising said laser light source and said at least one other laser light source emit respective laser light beams having respective wavelengths corresponding to photosensitivities of said plurality of photosensitive layers.

13. The optical scanning apparatus according to claim 12, wherein said photosensitive material is a photographic paper used for a photographic print.

* * * * *